March 31, 1964  J. G. DI PINTO  3,127,457
METHOD OF MOLDING A POLYURETHANE FOAM IN A MOLD
HAVING AN IMPROVED RELEASE AGENT
Filed Nov. 18, 1960

INVENTOR
JOSEPH G. DI PINTO

BY

AGENT

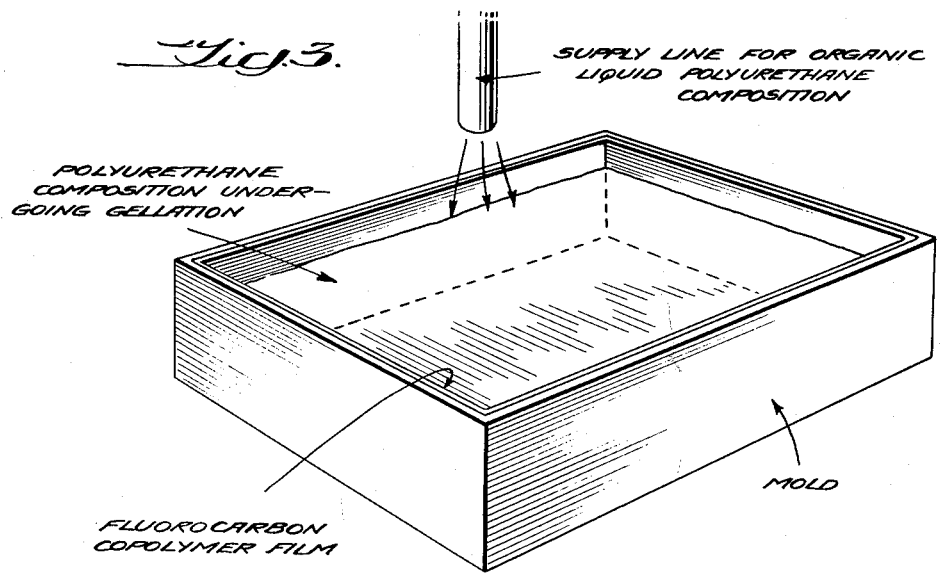
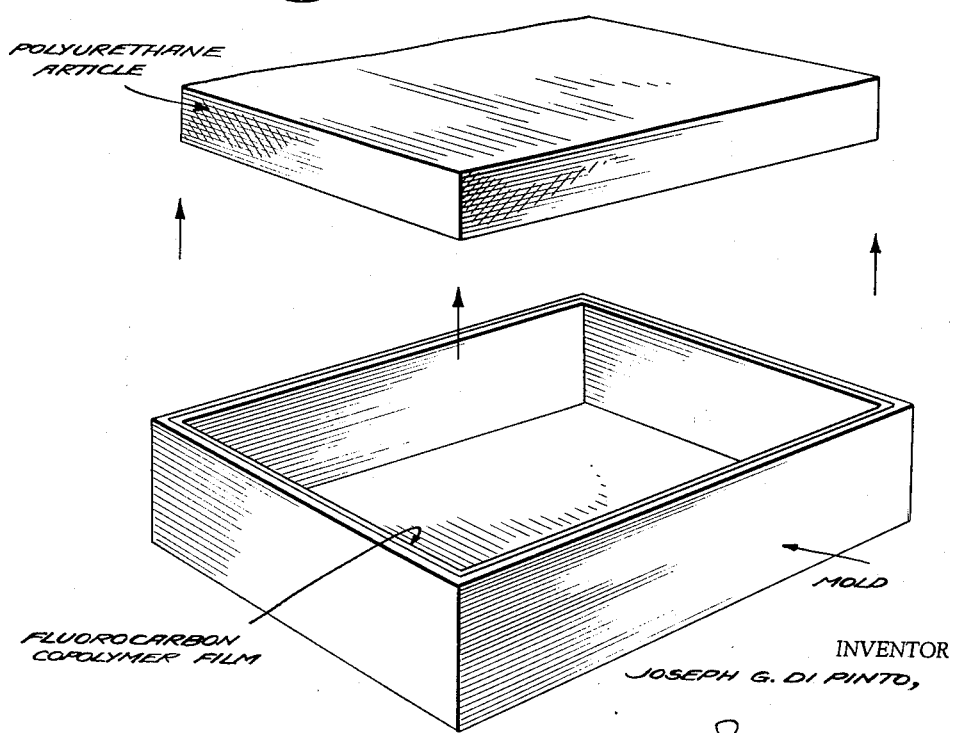

United States Patent Office 3,127,457
Patented Mar. 31, 1964

3,127,457
METHOD OF MOLDING A POLYURETHANE FOAM IN A MOLD HAVING AN IMPROVED RELEASE AGENT
Joseph G. Di Pinto, Wilmington, Del., assignor to E. I. du Pont de Nemours and Company, Wilmington, Del., a corporation of Delaware
Filed Nov. 18, 1960, Ser. No. 70,106
3 Claims. (Cl. 264—54)

This invention relates to an improved process for preparing polyurethane articles and more particularly to the use of a fluorocarbon copolymer film as a release agent for molding both solid and cellular polyurethane articles.

Both solid and cellular molded polyurethane articles are becoming an increasingly valuable article of commerce. The present processes available for molding polyurethane articles, in particular those used in making polyurethane foams, are not entirely satisfactory because the mold release agent must be reapplied each time before the mold is loaded. It is known that polytetrafluoroethylene coatings may be used as release agents; however, it has been found that such coatings are not entirely satisfactory because they appear to have fine pinholes which permit strike-through of the fluid composition applied thereon; thus, it is not usually possible to obtain multiple releases. It would be highly desirable to find a new and improved way to release polyurethane articles from the molds.

It is an object of the present invention to provide a new process for preparing polyurethane articles. It is a further object to provide a new process for molding both solid and cellular polyurethane articles. It is a still further object to provide a way of obtaining multiple releases when molding both solid and cellular polyurethane articles.

These and other objects of this invention are accomplished by the use of a specific fluorocarbon copolymer in the formation of polyurethane articles. This fluorocarbon material is a coplyomer consisting of about 5 to 50% by weight of hexafluoropropene units and about 95 to 50% by weight of tetrafluoroethylene units. More particularly this process may be defined as preparing a polyurethane article, with the proviso that the curable, ungelled polyurethane reaction mixture is maintained in contact with a surface consisting of this tetrafluoroethylene-hexafluoropropene copolymer until said reaction mixture has gelled and become tack-free. By using this fluorocarbon copolymer as a mold release agent in the formation of both solid or cellular polyurethane articles, it is possible to obtain effective multiple releases; in other words, it is now possible to form additional polyurethane articles in contact with this mold release agent.

A particularly valuable embodiment of the present invention comprises introducing a foamable fluid polyisocyanate composition into a mold having surfaces consisting of said fluorocarbon copolymer, allowing the composition to expand and fill said mold, allowing the cellular mass thereby formed to gel and become tack-free, and removing the foam from the mold.

The critical feature of the present invention is the use of a surface consisting of a normally solid copolymer of tetrafluoroethylene and hexafluoropropene. These copolymers contain 5 to 50% by weight of hexafluoropropene units, the remainder being tetrafluoroethylene units. The copolymers are described in U.S. Patent 2,833,686. A preferred composition contains 7 to 27% by weight hexafluropropene units, the remainder being tetrafluoroethylene units; these copolymers are described in U.S. 2,946,763. A particularly preferred composition contains 84% by weight tetrafluoroethylene units and 16% by weight hexafluoropropene units and has a density of about 2.15 grams per cubic centimeter.

The present invention will be more clearly understood by reference to the drawings which depict a representative embodiment of a mold having the multirelease characteristic with respect to forming polyurethane articles therein and a representative process for preparing these articles in said mold and in which:

FIG. 3 shows a mold lined as in FIG. 1 and containing polyurethane composition undergoing gellation; and FIG. 4 shows the article formed from the polyurethane composition depicted in FIG. 3 and released from the mold thereof.

Figure 1:
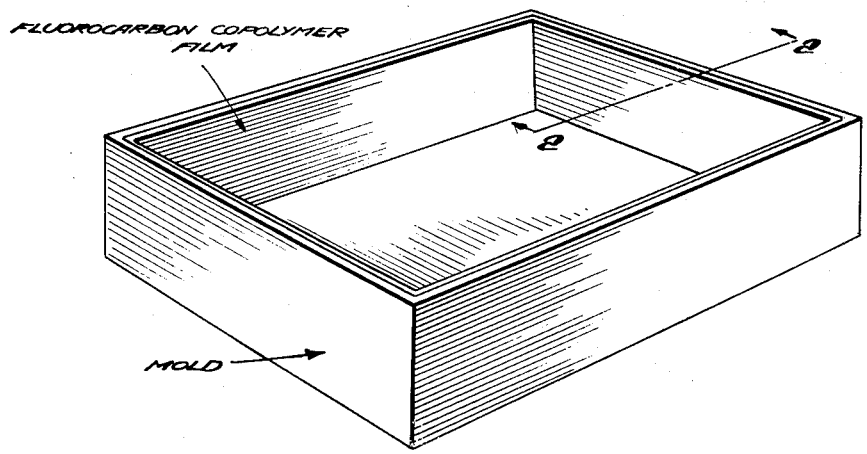
FIG. 1 shows an isometric view of an open cavity mold having an inner lining made of a fluorocarbon copolymer of the type described above.
Figure 2:
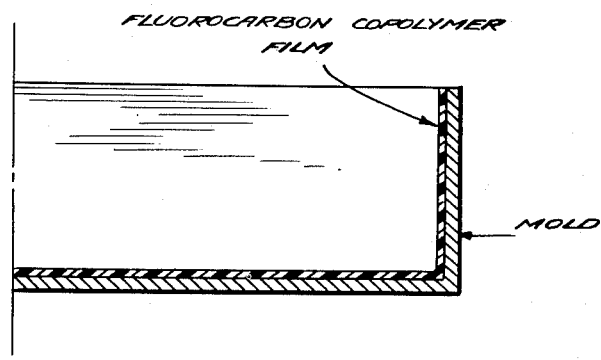
FIG. 2 shows an enlarged cross section view taken along line 2—2 of FIG. 1.

Although an entire mold may be made from the above-described copolymers, it is more economical and completely satisfactory to employ a film of the above described copolymers which film is inserted into a mold cavity and made to conform to the outline thereof. Vacuum forming or heat forming techniques familiar to those skilled in the art are particularly suitable here. Representative films have thicknesses such as ½, 1, 2, 5, 10, and 20 mils. Thicknesses of about 5 mils are particularly preferred. It is to be understood that the thicknesses are not critical. Shown in FIGS. 1 and 2 is a representative embodiment of a finished mold in which a mold of the desired shape is provided and in which the molding surface thereof is a film of a fluorocarbon copolymer consisting of about 5 to 50% by weight of hexafluoropropene units and about 95 to 50% by weight of tetrafluoroethylene units. In FIG. 3 is shown a polyurethane composition or reaction mixture made by reacting an organic polyisocyanate with an organic compound having at least two groups bearing Zerewitinoff-active hydrogen atoms and being maintained in contact with the above-described fluorocarbon copolymer film lining the mold until the reaction mixture has gelled and become tack-free. FIG. 4 shows the polyurethane article prepared in the foregoing manner released from the mold, whereby the fluorocarbon copolymer film is available for forming and releasing subsequently molded polyurethane articles.

Although the process of the present invention is particularly described hereinafter with respect to molding polyurethanes, it is to be understood that it is applicable to any operation wherein release of polyurethanes is desired. Thus, one can apply a foamable polyurethane composition to a flat sheet of the above-described fluorocarbon copolymer and thereafter strip off the tack-free slab of foam obtained.

The maximum temperature which can be tolerated during the operation of the present invention will depend at least in part upon the decomposition temperature of the fluorocarbon copolymer itself. It will also, of course, depend upon the nature of the polyurethane composition being introduced onto the surface. Those skilled in the art can readily determine the maximum useful temperature. In general, the operating temperature ranges between about 20 and 200° C., 20–150° C. being preferred. For foam preparation, 20–90° C. is particularly advantageous.

In the operation of the present invention it is merely necessary to form a reactable composition, either by hand stirring in the conventional manner or with conventional mixing heads, and to deposit it onto the fluorocarbon surface (which may be preheated, if desired). Thereafter the composition is allowed to gel and become tack-free. When desired, the surface may be heated to accelerate the rate of cure. After the polyurethane product has become tack-free it is stripped from the surface which is thereafter ready for introduction of another batch of reactable material. Unlike previous processes, it is not necessary to coat the surface with a mold release agent each time after the product has been removed. Instead, it is only necessary to introduce more reactable composition thereon; since the polyurethane composition does not adhere to the fluorocarbon surface, it is possible to obtain as many releases as desired.

The present process may be operated under superatmospheric pressure, atmospheric pressure, or subatmospheric pressure. When making a foam the foamable composition is introduced into a mold at atmospheric pressure and the composition is allowed to expand and fill the mold. However, a foamable composition may be introduced under superatmospheric pressure and thereafter the pressure is reduced to cause the expansion of a gas-forming body contained therein.

The polyurethane articles which may be prepared according to the improved process of this invention are obtained by reacting an organic compound having at least two groups bearing Zerewitinoff-active hydrogen atoms with an organic polyisocyanate. Other reactants, such as chain extending agents, may also be employed depending on the particular polyurethane article desired. Thus, in forming a cellular material, a gas-generating material, such as water, is used.

In carrying out the process of this invention an organic polyisocyanate is reacted with a compound bearing at least two groups bearing a Zerewitinoff-active hydrogen atom. Kohler in J. Am. Chem. Soc. 49, 3181 (1927) describes a test for such hydrogen atoms. General discussions of typical reactions of organic isocyanates and compounds having active hydrogen atoms are presented in the following review articles: Chem. Rev. 43, pp. 207–211 (1948); Chemistry of Organic Isocyanates, HR-2, Elastomers Division, E. I. du Pont de Nemours and Co., Inc., Wilmington 98, Delaware; Chem. Rev. 57, pp. 47–76 (1957). In general, these hydrogen atoms are attached to carbon, oxygen, nitrogen or sulfur atoms. Compounds containing one or more of the following groups will have active hydrogen atoms: acetamido, primary amino, secondary amino, amido, carbamyl, carboxyl, diazoamino, hydrazino, hydrazo, hydrazono, hydroxamino, hydroxyl, imido, imino, isonitro, isonitroso, mercapto, nitroamino, oxamyl, sulfamino, sulfamyl, sulfino, sulfo, thiocarbamyl, triazino, ureido, ureylene, and urethaneo. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, —CSNH$_2$. Representative examples of these compounds include the aliphatic polyols described hereinafter, hydroquinone, 1,2-ethanedithiol, mercapto-ethanol, p-aminophenol, piperazine, ethanolamine, propylenediamine, hexamethylenediamine, ethylenediamine, m-phenylenediamine, toluene-2,4-diamine, cumene-2,4-diamine, 4,4'-methylenedianiline, 4,4'-methylenebis(2-chloroaniline), urea, guanidine, aminopropionic acid, β-hydroxypropionic acid, succinic acid, adipic acid, 4-hydroxybenzoic acid, terephthalic acid, isoterephthalic acid, 4-aminobenzoic acid, N-β-hydroxyethyl propionamide, succinamide, adipamide, 4-aminobenzamide, sulfanilamide, 1,4-cyclohexanedisulfonamide, 1,3-propanedisulfonamide, and 1,2-ethanedisulfonic acid. Synthetic Organic Chemistry, R. B. Wagner and H. D. Zook, J. Wiley & Sons, Inc., N.Y., 1953, contains tables listing many other representative compounds of these types. Polymers containing urethaneo

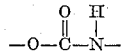

and ureido

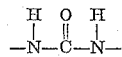

groups are also suitable here.

Insofar as the operation of the present invention is concerned, the molar proportions of the isocyanate compounds and the compounds bearing Zerewitinoff-active hydrogen atoms can vary widely. Those skilled in the art can determine the proportions of reactants best suited for a particular purpose. For example, when making polyurethane elastomers approximately equimolar amounts of glycol and diisocyanate are often used. When making polyurethane foams by reacting isocyanate-terminated polyurethanes and water, 0.5 mole of water for every NCO— group present is usually provided. When using arylene primary diamines to cure polyisocyanates, about 0.5–1.0 NH$_2$— groups for each NCO— group is usually supplied.

Representative examples of self-curable organic liquid polyurethane compositions which may be used in the process of this invention, particularly to make the solid polyurethane articles, include mixtures of amines and epoxide-terminated polyalkyleneether polyurethanes (U.S. Patent 2,830,038); mixtures of a polytetramethyleneether glycol and 1,3-bis(3-isocyanato-p-tolyl)urea (U.S. Patent 2,858,298); mixtures of polyurethane diamines and epoxy resins (U.S. Patent 2,888,439); mixtures of polyester polyols and polyisocyanates (Bayer et al. in "Rubber Chemistry and Technology," vol. 23, pp. 812–835); mixtures of polyester polyurethanes and N,N'-β-dihydroxyethyl urea (U.S. Patent 2,822,349); mixtures of polyisocyanate-modified polyesters and glycols (U.S. Patent 2,729,618); mixtures of polyisocyanate-modified polyesters and diamines or aminoalcohols (U.S. Patent 2,620,-516); mixtures of isocyanate-terminated polyalkyleneether polyurethanes and aliphatic polyols (British Patent 733,624); mixtures of isocyanate-terminated polyalkyleneether-thioether glycols and diamines or diols (U.S. Patent 2,917,489); mixtures of isocyanate-terminated polyalkyleneether polyurethane compounds, an acid-reacting substance or an organic compound containing a plurality of active hydrogen atoms (British Patent 796,044); isocyanate-terminated polyester polyurethanes with polyols or polyamines (U.S. Patent 2,621,166); isocyanate-modified polyether acetals with fatty acid esters containing at least 2 alcoholic hydroxyl groups (German Patent 1,045,095) and the self-curable isocyanate compositions of U.S. 2,889,883.

Organic liquid polyurethane compositions, which are not self-curable and which may be used in the present invention, are polytetramethyleneether polyurethanes (U.S. Patent 2,901,467); polyester polyurethanes (French Patent 1,201,5355, Australian application 20,059/53); isocyanate-terminated fatty acid triglycerides (U.S. Patent 2,787,601); isocyanate-terminated castor oil-epoxy resin condensation products (U.S. Patent 2,788,335); isocyanate-terminated polysulfides (U.S. Patent 2,814,600); isocyanate-terminated fatty acid triglyceride-polyol mixtures (U.S. Patent 2,833,730); isocyanate-terminated polyether-polyol mixtures (U.S. Patent 2,850,461); and isocyanate-terminated polytetramethyleneether polyurethanes (U.S. Patent 2,901,445, British Patent 797,965).

When the organic polyurethane composition contains terminal —NCO groups, it may be cured by introducing organic compounds having a plurality of alcoholic hydroxyl groups or amino groups. In particular, these curing agents may be defined as being low molecular weight organic polyols or organic diamines. At least about 0.5 mole of organic diamine should be employed for every mole of free isocyanate group in the isocyanate-terminated organic liquid composition. Arylene diamines are preferred; however, aliphatic diamines may be used under certain circumstances. It is to be understood that the term "arylene diamines" means those compounds in which each of the two amino groups is attached directly to an aromatic ring. The more convenient arylene diamines should exhibit a pKb at 25° C. of at least about 8.7. It is particularly convenient to use arylene diamines exhibiting a pKb at 25° C. of at least about 11.7. Representative examples of these preferred amines are 4,4'-methylene-bis(2-chloroaniline), 4,4'-methylene-bis(2-carbomethoxyaniline), 4,4'-diaminodiphenyldisulfide, and 4,4'-diaminodiphenylsulfone. Other useful arylene diamines are: 4,4'-methylene-bis(2-methylaniline), 4,4'-methylene-bis(2-methoxyaniline), 4,4'-methylene - bis(3 - bromoaniline) and 4,4'-methylenedianiline. Mixtures of diamines may be used. Aliphatic diamines which may be used include 1,6 - hexamethylenediamine, diethylenetriamine, 1,2-propanediamine, ethylenediamine, cadaverine, putrescine, piperazine, and 2,5-dimethylpiperazine.

The organic polyols may be substituted for part or all of the diamine for curing the isocyanate-terminated organic liquid polyurethane composition. The amount of polyol employed should be sufficient to provide about 1 alcoholic hydroxyl group for each free isocyanate group. In other words, a stoichiometric equivalent amount should be used. Representative glycols include ethylene glycol,
propylene glycol,
trimethylene glycol,
1,2-butylene glycol,
1,3-butanediol,
1,4-butanediol,
1,5-pentanediol,
1,2-hexylene glycol,
1,10-decanediol,
1,2-cyclohexanediol,
2-butene-1,4-diol,
3-cyclohexene-1,1-dimethanol,
4-methyl-3-cyclohexene-1,1-dimethanol,
3-methylene-1,5-pentanediol,
diethylene glycol,
(2-hydroxyethoxy)-1-propanol,
4-(2-hydroxyethoxy)-1-butanol,
5-(2-hydroxypropoxy)1-pentanol,
1-(2-hydroxymethoxy)-2-hexanol,
1-(2-hydroxypropoxy)-2-octanol,
3-allyloxy-1,5-pentanediol,
2-allyloxymethyl-2-methyl-1,3-propanediol,
[(4-pentenyloxy)methyl]-1,3-propanediol;
3-(o-propenylphenoxy)-1,2-propanediol,
thiodiglycol,
2,2'-[thiobis(ethyleneoxy)]diethanol,
polyethyleneether glycol (molecular weight 200) and
2,2'-isopropylidenebis(p-phenyleneoxy)diethanol.
In addition, one may use such triols as glycerol,
1,2,6-hexanetriol,
1,1,1-trimethylolpropane,
1,1,1-trimethylolethane,
3-(2-hydroxyethoxy)-1,2-propanediol,
3-(2-hydroxypropoxy)-1,2-propanediol,
3-(2-hydroxypropoxy)-1,2-propanediol,
2,4-dimethyl-2-(2-hydroxyethoxy)methylpentanediol-
  1,5,1,1,1-tris[(2-hydroxyethoxy)methyl]ethane,
1,1,1-tris[(2-hydroxypropoxy)methyl]propane,
triethanolamine,
triisopropanolamine and
N,N,N',N'-tetrakis(2-hydroxyethyl)ethylenediamine.

Mixtures of two or more of the above polyols may be used if desired.

Other organic compositions (not self-curable) which may be used as organic liquids in the present process are the hydroxyl-terminated materials such as the hydroxyl-terminated polyhydrocarbons (U.S. Patent 2,877,212); hydroxy-terminated polyformals (U.S. Patent 2,870,097); fatty acid triglycerides (U.S. Patents 2,833,730 and 2,787,601); hydroxyl-terminated polyesters (U.S. Patents 2,698,838, 2,921,915, 2,591,884, 2,866,762, 2,850,476, 2,602,783, 2,729,618, 2,779,689, 2,811,493, and 2,621,166); hydroxymethyl - terminated perfluoromethylenes (U.S. Patents 2,911,390 and 2,902,473); polyalkyleneether glycols (U.S. Patent 2,808,391; British 733,624); polyalkylenearyleneether glycols (U.S. Patent 2,808,391); polyalkyleneether triols (U.S. Patent 2,866,774).

When the organic liquid polyurethane composition contains terminal —OH groups, curing may be accompanied by the addition of polyisocyanates. Representative polyisocyanates include toluene-2,4-diisocyanate,
1,6-hexamethylenediisocyanate,
1,4-tetramethylenediisocyanate,
1,10-decamethylenediisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3-dimethyl-4,4'-diisocyanatodiphenylmethane,
2,6-dimethyl-4,4-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran, and
2,4,6-toluenetriisocyanate.

It is frequently advantageous to accelerate the formation of the polyurethane article by introduction of a catalyst, particularly when preparing cellular materials using water to generate carbon dioxide as the foaming agent. These catalysts may be selected from a wide variety of tertiary amines, such as N-methyl morpholine, triethylamine, triethylamine N-oxide, diethanolamine, diethylethanolamine, dimethyloctadecylamine, β-morpholinopropionamide, 3-diethylaminopropionamide, N,N,N',N'-tetramethylethylenediamine, and triethylenediamine. Dibutyltindilaurate and stannous octoate are particularly useful for "one shot" foaming systems. Ferric acetylacetonate is often used to promote urethane formation.

Any of a wide variety of rigid, semi-rigid and resilient polyurethane cellular products can be made by the process of this invention. In general, these polyurethane cellular materials are prepared by the reaction of a relatively high molecular weight polyhydroxy compound, an organic polyisocyanate, and optionally, a low molecular weight compound having at least 2 groups bearing Zerewitinoff-active hydrogen atoms, in the presence of a gaseous expanding agent. The selection of the polyhydroxy compound and/or the polyisocyanate will determine the type of polyurethane obtained. The reaction of the polyhydroxy compound with the organic polyisocyanate, and optionally the other above-described compounds having Zerewitinoff-active hydrogen atoms, produces the polyurethane; the cellular nature of the final product results from the generation of a gaseous expanding agent therein prior to the completion of the reaction. This gaseous expanding agent may be carbon dioxide resulting by the reaction of water with the polyisocyanate compound with the simultaneous formation of urea cross-links. It may also be a liquid, inert to the reactants, which will vaporize at the temperature of the reaction and thereby cause expansion to the cellular material. Representative liquids which may be used include pentane and similar volatile aliphatic hydrocarbons; volatile polyhalogenated hydrocarbon compounds such as trichlorofluoromethane, which is preferred, dichlorodifluoromethane, trichlorotrifluoroethane, dichlorohexafluoropropane, monofluoroheptafluorocyclobutane, dichlorodifluoroethylene, and 2,3-dichloro-1,1,3,3-tetrafluoropropene-1.

A wide variety of polyhydroxy compounds can be employed for making the polyurethane polymer material. These polyhydroxy compounds should have molecular weights ranging from about 400 to about 8000, a molecular weight of about 400 to 5000 being preferred. Low molecular weight polyhydroxy compounds will, in general, yield rigid foams, particularly if these compounds are highly branched materials such as triols, tetrols, hexols or higher functional materials. The high molecular weight polyhydroxy compounds yield a more resilient type of cellular product. Polyols having molecular weights ranging from about 1000 to 5000 are particularly useful for this purpose. Representative polyhydroxy compounds include polyalkylene ether glycols, polyalkyleneetherthioether glycols, polyalkylene-aryleneether glycols, polyaliphatic hydrocarbon diols, polyester polyols, polyalkyleneethers having at least 3 hydroxyl groups, fatty acid triglycerides having a hydroxyl number of at least about 33, and compounds which are made by reacting polyamines with alkylene oxides, such as tetrol made with ethylene diamine and ethylene and/or propylene oxide. It is to be understood that 2 or more different polyols may be reacted with the organic polyisocyanate.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 400 to 8000. Not all of the alkylene radicals need be the same. When resilient foams are prepared the preferred polyalkyleneether glycols have molecular weight ranging from about 1000 to 5000; when rigid foams are made, the preferred glycols have molecular weights ranging from about 400 to 1000. Representative examples of these glycols are poly-1,2-propyleneether glycol, 1,2-polydimethylethyleneether glycol, ethylene oxide-modified poly-1,2-propyleneether glycol, polytetramethyleneether glycol, polypentamethyleneether glycol, and polytetramethyleneformal glycol. These polyalkyleneether glycols are made by the polymerization of cyclic ethers such as alkylene oxides or dioxolane or by condensation of glycols.

The polyalkyleneether-thioether glycols may be represented by the formula $HO(GY)_nH$, wherein G represents hydrocarbon radicals at least some of which are alkylene, Y represents chalcogen atoms some of which are sulfur and the rest oxygen, and $n$ is an integer sufficiently large so that the glycol has a molecular weight of about 400 to 8000.

The polyalkylene-aryleneether glycols are similar to the polyalkyleneether glycols except that some arylene radicals are present. The phenylene, naphthalene and anthracene radicals may be used with or without substituents such as alkyl or alkylene groups. When part of the ether oxygens are replaced with sulfur, a polyalkylene-aryleneether-thioether glycol results, which also may be used in the present invention.

Polyalkyleneethers having 3 or more hydroxyl groups are particularly useful. These polyethers polyols are made by reacting alkylene oxides such as ethylene oxide and propylene oxide with low molecular weight aliphatic polyols such as glycerine, trimethylolpropane, trimethylolethane, 1,2,6-hexanetriol and sorbitol.

Other representative examples are described in the following publications: Australian application 52,266/59; South African 3931/59; Belgium Patent 584,089; Belgium Patent 582,076; Australian application 54,452/59; and U.S. 2,856,774.

The procedure for making the polyurethane cellular materials may be carried out in any one of several ways. In the first instance a prepolymer is formed by reacting the polyhydroxy compound with a molar excess of an organic polyisocyanate to form an isocyanate-terminated polyurethane, mixing this polyurethane with water and catalyst, and pouring the foamable mass into a mold having a surface made of the above-described fluorocarbon copolymer. In another procedure, a part of the polyhydroxy compound is reacted with a molar excess of a polyisocyanate while another portion of the polyhydroxy compound is reacted with a molar deficiency of the polyisocyanate. Into the latter reaction product are mixed a catalyst and a vaporizable liquid such as trichlorofluoromethane. Finally, then the two masses are mixed and poured into the fluorocarbon copolymer mold. In this case, the heat of reaction of the isocyanate and the polyhydroxy compound is sufficient to vaporize the volatile liquid to foam the mass. In a third method, the high molecular polyhydroxy compound is reacted with a molar excess of an organic polyisocyanate and the isocyanate-terminated polyurethane formed is mixed with a volatile liquid and enough of a low molecular weight polyhydroxy compound to react with the remaining free isocyanato groups. This mixture is then introduced into the mold. A fourth procedure involves the simultaneous introduction of a polyhydroxy compound, a polyisocyanate, a catalyst, and optionally, a surfactant, and optionally water, into a mixer from which the foamable mass is discharged directly into the fluorocarbon copolymer mold. Alternatively, a self-curable froth made from an isocyanate composition may be introduced into a mold having a surface of the above-described fluorocarbon copolymer and thereafter cured to a tack-free foam. This froth may be made by passing an organic liquid and an inert gas together through a frothing zone consisting essentially of at least one perforated plate having a plurality of openings whose number-average size is such that the average minor axis of any opening is not less than 10 microns and the average major axis of any opening is not greater than 2000 microns, thereby causing at least a portion of the organic liquid and the inert gas to form a froth consisting essentially of a plurality of bubbles having a number average particle size ranging from about 1 to 2000 microns, reducing the pressure over the froth to less than the pressure at which it was formed, thereby causing expansion of the froth. The organic liquid precursor for the cured organic material has a Brookfield viscosity at the temperature at which the froth is formed below about 20,000 cps.; the ratio in cu. ft./lb. of the inert gas to the organic liquid entering the frothing zone having a value ranging from about 30:1 to 100:1, with the proviso that when more than one perforated plate is employed, the number-average distance between the adjacent surfaces of the plates shall be such that the ratio of the distance between said adjacent surfaces to the total area have a value greater than about 0.014. Another method of making a froth suitable for use in the mold having the fluorocarbon copolymer surface consists of forming at superatmospheric pressure a mixture of a fluid polyurethane foam precursor and a volatile inert organic liquid and/or an inert gas, causing a controlled expansion of the mixture to give an ungelled cellular product by reduction of the pressure thereon during passage through a diverging orifice under laminar flow conditions at a velocity such that the Reynolds number will not exceed 4000. Still another process consists of spraying a polyurethane foam into the mold by forming at superatmospheric pressure a mixture of a polyurethane foam precursor and a volatile inert organic liquid and/or an inert gas, reducing the pressure thereon during passage through an orifice under turbulent flow conditions at a velocity such that the Reynolds number is greater than 4000, thereby causing the stream to break-up and impinge on the surface of the mold and form a cellular article.

In preparing the celular materials, it is often desirable to incorporate a surfactant to help control the pore-size and uniformity. Among the more suitable surfactants are organo silicone polymers such as polydimethylsiloxane and block polymers obtained by condensing a polyalkoxy polysiloxane with the monoether of a polyethyleneether glycol.

The following examples will better illustrate the nature of the present invention; however, the invention is not intended to be limited to these examples. Parts are by weight unless otherwise indicated.

*Example 1*

A. Polyol mixture.—A polyol mixture was prepared from the following:

| | Parts |
|---|---|
| Triol | 75 |
| Glycol | 20 |
| Organosiloxane | 2 |
| Trichloromonofluoromethane | 5 |
| Triethylenediamine | 0.6 |
| Water | 3.7 |

The triol in this mixture is a polypropyleneether triol, having a molecular weight of 3000, a hydroxyl number of 56 and is prepared by reacting propylene oxide with glycerine. The glycol is a polypropyleneether glycol having a molecular weight of 2000 and a hydroxyl number of 56. The organosiloxane is a polydimethylsiloxane-polyethyleneether block copolymer made in accordance with Example 1(a) of U.S. Patent 2,837,748.

B. Catalyst mixture.—A catalyst mixture was prepared from the following:

| | Parts |
|---|---|
| Triol (same as in Part A) | 5 |
| Stannous octoate | 0.2 |

C. Diisocyanate mixture.—The diisocyanate mixture is an isometric mixture of 80 parts of 2,4-toluene diisocyanate and 20 parts of 2,6-toluene diisocyanate.

D. The above mixtures were pumped at the following rates and temperatures to an on-off mixer of the type described in U.S. Patent 2,868,515 having an agitator operating at 5000 revolutions per minute:

| | Grams/min. |
|---|---|
| Polyol mixture (26.7° C.) | 2760 |
| Diisocyanate mixture (25° C.) | 1240 |
| Catalyst mixture (25° C.) | 135 |

The following composition emerged from the mixer:

| | Parts |
|---|---|
| Triol | 80 |
| Glycol | 20 |
| Organosiloxane | 2 |
| Trichloromonofluoromethane | 5 |
| Triethylenediamine | 0.6 |
| Water | 3.7 |
| Stannous octoate | 0.2 |
| Isomeric diisocyanate mixture | 48 |

This composition was immediately introduced into a foam mold, preheated to 37.8° C. having a liner, 10 mils thick, consisting of a normally solid fluorocarbon copolymer having a density of 2.15 grams/cc. and consisting of about 84% by weight of tetrafluoroethylene units and 16% by weight of hexafluoropropene units. This copolymer was prepared according to Example 1 of U.S. Patent 2,946,763. The mold was then placed in a 121° C. oven for 20 minutes. The resilient foam obtained, which had a density of 2.0 lb./cu. ft., was easily removed from the mold.

*Example 2*

A. An aluminum foam mold (about 7 inches wide, 12 inches long and 2 inches high) was lined with a fluorocarbon copolymer having a density of 2.15 grams/cc. The thickness of the lining was 10 mils. The copolymer consisted of 84% by weight of tetrafluoroethylene units and 16% by weight of hexafluoropropene units.

B. The following components were mixed together at about 25° C. in the order given:

| | Parts |
|---|---|
| Triol (of Example 1A) | 100 |
| Organosiloxane (of Example 1A) | 1.5 |
| Stannous octoate | 0.2 |
| Triethylenediamine | 0.6 |
| Water | 3.7 |
| Trichloromonofluoromethane | 5.0 |
| Diisocyanate mixture (of example 1C) | 48 |

This foamable mixture was poured into the mold of part A above which had been preheated to 37.8° C. The mold was thereafter transferred to a 121° C. oven and maintained therein for a period of time of about 25 minutes during which time the mixture expanded to form a tack-free resilient foam having a density of about 2.0 lb./cu. ft. This foam, which filled the mold, was easily released by the fluorocarbon copolymer.

The above process was repeated 20 times and each time the tack-free resilient foam obtained could be readily stripped from the mold. During 3 of these runs, a mold cover-plate was used whose underside was lined with the fluorocarbon copolymer.

At the time this experiment was stopped, the mold liner was operating as effectively as it had from the very beginning.

*Example 3*

A. 278.7 parts of toluene-2,4-diisocyanate and 1000 parts of anhydrous polytetramethyleneether glycol having a molecular weight of 1000 were agitated at 80° C. for 4 hours in a dry reaction vessel protected from atmospheric moisture. The polyurethane polymer thus obtained had a free isocyanate content of 4.2%, a Brookfield viscosity at 30° C. of about 16,500 cps., and a number-average molecular weight of about 2000.

B. 100 grams of the polyurethane polymer of part A above were mixed at 100° C. with 11 grams of 4,4'-methylenebis(2-chloroaniline). Fifty grams of the fluid composition thereby obtained were poured onto a flat sheet (3 mils thick) of a hexafluoropropene/tetrafluoroethylene copolymer (containing about 15% hexafluoropropene units by weight) and heated thereon at 100° C. for 40 minutes. When the sheet was then turned over, excellent release occurred—the solid polyurethane elastomer, which had formed, fell away.

C. The procedure of part B above was repeated 12 times using the same sheet of fluorocarbon copolymer. Excellent release always occurred.

*Example 4*

A. A seal was molded in a vacuum formed mold prepared from a fluorocarbon copolymer film of approximately 10–15 mils thick. The fluorocarbon had a density of 2.15 grams/cc. and consisted of about 84% by weight of tetrafluoroethylene units and 16% by weight of hexafluoropropene units. The seal had an outside diameter of about 3 inches, a ¾ inch hole in the center, was ¼ inch thick with a raised lip about ⅛ inch on the outer edge.

B. 100 parts of the polyurethane polymer of Example 3A was mixed at 100° C. with 11 grams of 4,4'-methylenebis(2-chloroaniline). The fluid composition thereby obtained was poured into the mold described in part A of this example and heated at 100° C. for 3 hours. When the mold was inverted excellent release was obtained in that the polyurethane polymer fell out of the mold. Multiple releases were obtained with no difficulty.

*Example 5*

A. 696 parts of toluene-2,4-diisocyanate was added to a mixture of 1000 parts of anhydrous polytetramethyleneether glycol having a molecular weight of about 1000 and 90 parts by weight of 1,3-butanediol. The resulting mixture was stirred and heated for 4 hours at 80° C. under a protective nitrogen atmosphere. The polyurethane polymer thus obtained had a free isocyanate content of about 9.4% and a Brookfield viscosity at 30° C. of 14,000 cps.

B. 100 parts of the polyurethane polymer of part A of this example were mixed at 85° C. with 29.5 parts of 4,4'-methylenebis(2-chloroaniline). The mixture was then poured into the mold as described in part A of Example 4 and heated at 100° C. for one hour. When the mold was inverted the polyurethane polymer fell out of the mold and multiple releases were obtained with no difficulty.

As many widely different embodiments of this invention may be made without departing from the spirit and scope thereof, it is to be understood that this invention is not limited to the specific embodiments thereof except as defined in the appended claims.

What is claimed is:

1. In the process of preparing polyurethane articles which process comprises reacting an organic polyisocyanate with an organic compound having at least two groups bearing Zerewitinoff-active hydrogen atoms and allowing the resulting mixture to gel and become tack-free, the improvement of obtaining multiple releases by a mold surface to said polyurethane articles when successively molded thereagainst by the steps of maintaining the ungelled reaction mixture in contact with a solid surface comprising said mold surface and consisting of a fluorocarbon copolymer until said reaction mixture has gelled and become tack-free, said copolymer consisting of about 5 to 50% by weight of hexafluoropropene units and about 95 to 50% by weight of tetrafluoroethylene units and removing said tack-free reaction product from said solid surface, whereby said solid surface is available for release of successively molded polyurethane articles.

2. A process according to claim 1 wherein the fluorocarbon copolymer consists of about 16% by weight of hexafluoropropene units and about 84% by weight of tetrafluoroethylene units.

3. A process according to claim 1 wherein a gaseous expanding agent is generated in the reaction mixture resulting from reacting said organic polyisocyanate with said organic compound before said reaction mixture has gelled and become tack-free, whereby the polyurethane articles obtained are cellular.

References Cited in the file of this patent

UNITED STATES PATENTS

| | | |
|---|---|---|
| 2,598,283 | Miller | May 27, 1952 |
| 2,729,613 | Miller | Jan. 3, 1956 |
| 2,733,277 | Miller | Jan. 31, 1956 |
| 2,833,686 | Sandt | May 6, 1958 |
| 2,894,042 | Miller | July 7, 1959 |
| 2,946,763 | Bro et al. | July 26, 1960 |

FOREIGN PATENTS

| | | |
|---|---|---|
| 785,733 | Great Britain | Nov. 6, 1957 |

OTHER REFERENCES

Chemical and Engineering News, "Fluorine Plastics," vol. 30, No. 26, June 1952, pages 2688–9.

Product Engineering, "Foamed Insocyanates, Formation, Properties, Applications," February 1955, pp. 140 and 141. (Copy in Sci. Lib.)